United States Patent

Kobayashi et al.

[15] 3,676,612

[45] July 11, 1972

[54] CURIE POINT MAGNETIC TAPE DUPLICATING APPARATUS WHEREIN THE MASTER AND SLAVE TAPES ARE WOUND ON A SINGLE TAKE-UP REEL

[72] Inventors: Fukashi Kobayashi, Hirakata; Mitsuaki Ono; Akio Kuroe, both of Osaka, all of Japan

[73] Assignee: Matsushita Electric Industrial Co., Ltd., Osaka, Japan

[22] Filed: Nov. 25, 1970

[21] Appl. No.: 92,793

[30] Foreign Application Priority Data

| | | |
|---|---|---|
| Dec. 9, 1969 | Japan | 44/99668 |
| Dec. 9, 1969 | Japan | 44/99670 |
| Dec. 9, 1969 | Japan | 44/99671 |
| Dec. 29, 1969 | Japan | 45/712 |
| Dec. 15, 1969 | Japan | 44/120336 |
| Dec. 17, 1969 | Japan | 44/120849 |
| Dec. 29, 1969 | Japan | 45/344 |
| Dec. 29, 1969 | Japan | 45/345 |
| Dec. 29, 1970 | Japan | 45/65610 |

[52] U.S. Cl. .................................... 179/100.2 E, 346/74 MT

[51] Int. Cl. .................................... G11b 5/86

[58] Field of Search .................... 179/100.2 E; 346/74 MT

[56] References Cited

UNITED STATES PATENTS

| | | | |
|---|---|---|---|
| 3,541,577 | 11/1970 | Lemke | 179/100.2 E |
| 3,177,299 | 4/1965 | Smith | 179/100.2 E |

OTHER PUBLICATIONS

Sugaya et al., " Magnetic Tape Duplication by Contact Printing at Short Wavelengths," I.E.E.E. Transactions on Magnetics, Vol. MAG-5, No. 3, pg. 437, 9/69.

*Primary Examiner*—Bernard Konick
*Assistant Examiner*—Robert S. Tupper
*Attorney*—Stevens, Davis, Miller & Mosher

[57] ABSTRACT

An apparatus for producing a copy of a magnetic tape in which a master tape having a record thereon and a slave tape heated to a temperature at least in the vicinity of the Curie point of a magnetic material coated thereon are continuously taken up on a single take-up reel in such a manner that they are in intimate contact with each other at their magnetic surfaces, and after cooling the master and slave tapes taken up on the take-up reel to a predetermined temperature, the master tape and the slave tape to which the signal recorded on the master tape is transferred are rewound on their respective supply reels.

12 Claims, 8 Drawing Figures

F. KOBAYASHI,
M. ONO AND
A. KUROE
INVENTORS

BY Stevens, Davis, Miller & Mosher
ATTORNEYS

CURIE POINT MAGNETIC TAPE DUPLICATING APPARATUS WHEREIN THE MASTER AND SLAVE TAPES ARE WOUND ON A SINGLE TAKE-UP REEL

This invention relates to an apparatus for producing a plurality of copy magnetic tapes from a master magnetic tape having a record thereon.

A magnetic tape copying apparatus has been proposed heretofore in which a master tape having a record thereon and a slave tape heated to the Curie point of a magnetic material coated thereon are brought into intimate contact with each other at their magnetic surfaces and then the tapes are cooled while being kept in intimate contact with each other so as to transfer the signal recorded on the master tape to the slave tape for producing a copy of the master magnetic tape. The master tape is coated with a magnetic material such as powdery $\gamma$-$Fe_2O_3$ having a Curie point of 590° C, while the slave tape is coated with magnetic material such as powdery $CrO_2$ having a Curie point of about 126° C. When the slave tape having the powdery $CrO_2$ coating is heated to a temperature in the vicinity of 126° C, the coercive force Hc of the magnetic material is greatly reduced and the magnetic material can be easily magnetized to its saturated state by the application of a slight magnetic field thereto. On the other hand, the signal recorded on the master tape having the powdery $\gamma$-$Fe_2O_3$ coating is not affected at all even when the master tape is heated to 126° C. Therefore, the signal recorded on the master tape having the powdery $\gamma$-$Fe_2O_3$ coating can be transferred to the slave tape having the powdery $CrO_2$ coating when these two tapes are brought into intimate contact with each other at their magnetic surface and are then heated up to the Curie point of the $CrO_2$ coating on the slave tape or when the slave tape having the $CrO_2$ coating is heated up to the Curie point of the magnetic material and is then brought into intimate contact at its magnetic surface with the magnetic surface of the master tape having the $\gamma$-$Fe_2O_3$ coating. The quality of the signal transferred onto the slave tape having the $CrO_2$ coating would be extremely deteriorated if the intimate contact between the master and slave tapes is released or slip occurs between these two tapes during the period of time in which the slave tape is cooled down to a temperature of about 60° C from the Curie point. More precisely, suppose that the amount of the signal transferred to the slave tape is 1 when the intimate contact between the master and slave tapes is released at a temperature lower than 60° C, then the amount of the signal transferred to the slave tape will be reduced to 0.9 and 0.75 when the intimate contact between these two tapes is released at 80° C and 100° C, respectively. In order to attain satisfactory transfer of the signal from the master tape to the slave tape, therefore, it is necessary to bring the slave tape heated to the Curie point of the magnetic material into intimate contact with the master tape and to keep these two tapes in intimate contact with each other until the temperature of the slave tape is lowered to about 60° C. Satisfactory transfer of the signal from the master tape to the slave tape cannot be expected if the slave tape is in insufficient contact with the master tape. In addition to the requirement for ensuring intimate contact between the master and slave tapes, stretching and any other deformation of the magnetic tapes due to heating must be taken into consideration. A synthetic resin such as polyethylene terephthalate is generally used as the base of the magnetic tape. The magnetic tape will be stretched or the base material thereof will be damaged when any tension is imparted to the base while the magnetic tape is being heated. In order to avoid undesirable damage to these tapes as much as possible, it is necessary to heat the tapes under a very small tension or to arrange it in such a manner that the magnetic material layers of these tapes are solely subjected to heating and the base surfaces are prevented from being heated.

With a view to solving the problems described above, it is an object of the present invention to provide a magnetic tape copying apparatus capable of satisfactorily transferring a record from a master tape to a slave tape at high speed.

Another object of the present invention is to provide means by which the slave tape heated to a temperature in the vicinity of the Curie point of the magnetic material and the master tape having the record thereof can be satisfactorily kept in intimate contact with each other at their magnetic surfaces during a predetermined period of time required for the transfer operation.

A further object of the present invention is to provide heating means so arranged as to minimize undesirable deformation of the slave tape due to heating.

Other objects, features and advantages of the present invention will be apparent from the following detailed description taken in conjunction with the accompanying drawings, in which.

Figure 1:
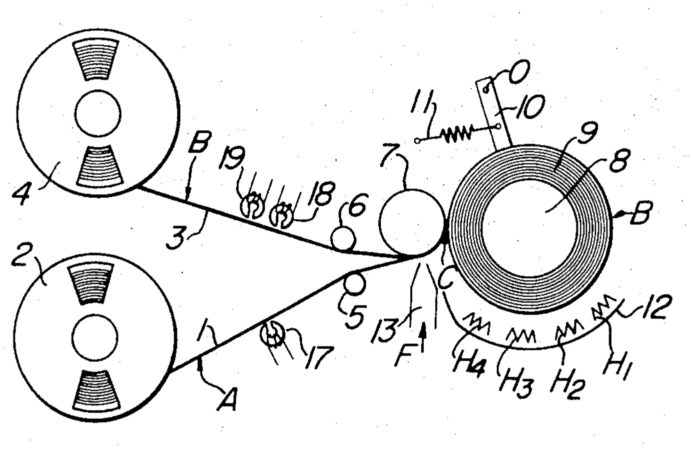
FIG. 1 is a schematic plan view of an embodiment of the present invention.

Referring to FIG. 1, a master tape 1 having a signal recorded on its magnetic coating is supplied from a supply reel 2, while a slave tape 3 coated with a magnetic material such as $CrO_2$ having a low Curie point is supplied from a supply reel 4. The master tape 1 supplied from the supply reel 2 and the slave tape 3 supplied from the supply reel 4 are guided by respective guide posts 5 and 6 to pass over a capstan 7 which drives the tapes 1 and 3, and at the same time, controls the position of the tapes 1 and 3. The master and slave tapes 1 and 3 engage a portion of the outer peripheral surface of the capstan 7 over a fixed angle while being brought into contact with each other at their base surface and are finally taken up on a take-up reel 8. The take-up reel 8 is pivoted to an arm or supported rod 10. The support rod 10 is freely swingable about a point 0 and is urged by a spring 11 so as to urge the take-up reel 8 into pressure contact with the capstan 7. Accordingly, the master tape 1 and the slave tape 3 are continuously taken up in superposed relation, on the take-up reel 8 with their magnetic surfaces engaging each other by being pressed at the nip between the capstan 7 and the take-up reel 8 so that these two tapes 1 and 3 are very satisfactorily brought into intimate contact with each other at their magnetic surface to form a tape laminate 9. The magnetic material layer of the master tape 1 is provided on the surface shown by the arrow A in FIG. 1, while the magnetic material layer of the slave tape 3 is provided on the surface shown by the arrow B. The slave tape 3 occupies the outer layer of the tape laminate 9 wound around the take-up reel 8, and at the outermost periphery of the tape laminate 9, the slave tape 3 has its magnetic material layer facing outwardly. Thus, the slave tape 3 and the master tape 1 run in such a relation that their magnetic surfaces engage each other at a point C.

Figure 2:
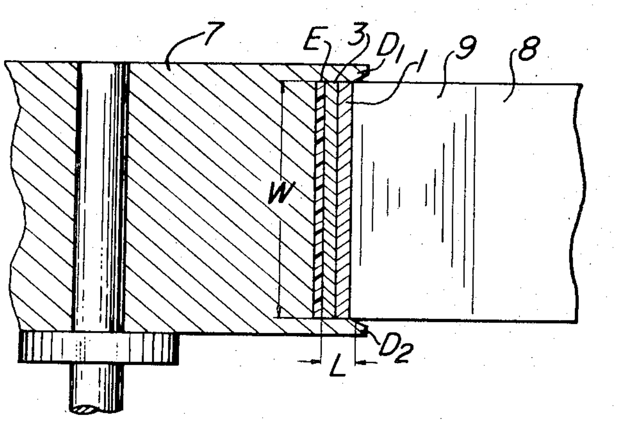
FIG. 2 is an enlarged vertical sectional view, partly broken away, of a part of the apparatus shown in FIG. 1.

As shown in FIG. 2, the capstan 7 is provided with flanges $D_1$ and $D_2$ at its upper and lower ends, respectively. The flanges $D_1$ and $D_2$ define therebetween a groove whose width W is slightly larger than the width of the master and slave tapes 1 and 3 and whose depth L is larger than the total thickness of the master and slave tapes 1 and 3. Due to such dimensions of the groove, one of the flanges $D_1$ and $D_2$ engages one edge of the tapes 1 and 3 so as to control the relative position of the tapes 1 and 3 running within the groove whereby these tapes 1 and 3 can be substantially registered widthwise. The surface of the groove is lined with a resilient member E of rubber or synthetic resin which is firmly fixed in place as by baking and frictionally engages the tape 3 so as to further ensure intimate contact between the master tape 1 and the slave tape 3. The take-up reel 8 is of a flange-less structure as shown in FIG. 2 so that, even when the tape laminate 9 of a short length is taken up thereon, the tape laminate 9 is forced into the groove of the capstan 7 to apply pressure to the master and slave tapes 1 and 3.

The master and slave tapes 1 and 3 are forcedly run by the drive means described above, and the slave tape 3 is solely subjected to heating during the take-up operation by a plurality of heaters $H_1$, $H_2$, $H_3$, and $H_4$ disposed adjacent to the take-up reel 8. The magnetic material layer of the slave tape 3 is easily heated up to a temperature in the vicinity of the Curie point of the magnetic material because the slave tape 3 taken up on the take-up reel 8 runs with its magnetic surface facing outwardly as described above. The magnetic material layer of the slave tape 3 heated up to about the Curie point of the magnetic material is brought into pressure contact with the magnetic surface of the master tape 1 at the point C, and the two tapes 1 and 3 are taken up on the take-up reel 8 in superposed relation. The slave tape 3 is gradually cooled down to room temperature while being taken up on the take-up reel 8. According to the above arrangement, any slip or insufficient contact between the master and slave tapes 1 and 3 can be completely eliminated throughout the period of time in which the slave tape 3 is cooled down to room temperature after it has been brought into intimate contact with the master tape 1. The present invention is advantageous in that undesirable stretching of the slave tape 3 is almost negligible because the slave tape 3 taken up on the take-up reel 8 is subjected to heating, that is, the slave tape 3 is subjected to heating in a substantially tension-free state. Further, according to the arrangement shown in FIG. 1 in which the slave tape 3 runs generally at high speed, the heating time is very short and thus the heat does not reach the inner base layer of the slave tape 3 even when the magnetic material layer, several microns thick, exposed to the exterior is heated to a temperature of the order of 130° C. In this respect too, undesirable stretching of the slave tape 3 can be prevented.

The heaters $H_1$, $H_2$, $H_3$, and $H_4$ in FIG. 1 are disposed independently of one another and are preferably generators of radiant heat such as infrared ray lamps or nichrome wire heaters. The heaters $H_1$, $H_2$, $H_3$, and $H_4$ are preferably disposed near the point C at which the slave tape 3 and the master tape 1 are brought into contact with each other at their magnetic surface so that the slave tape 3 having been heated to the predetermined temperature may not be cooled prior to contact with the master tape 1. It will be seen in FIG. 1 that a plurality of heaters $H_1$, $H_2$, $H_3$, and $H_4$ are provided in spaced apart relation so that these heaters may be selectively energized, depending on the speed with which the tapes 1 and 3 are taken up on the take-up reel 8. That is, all of the heaters $H_1$ to $H_4$ are energized when the take-up speed is high and the heater $H_4$ is solely energized when the take-up speed is low so as to always direct a constant quantity of radiant heat towards the slave tape 3 thereby enabling it to produce a good copy without the application of excessive heat to the tape. The heating temperature can be more stably maintained by arranging in such a manner that the heaters $H_1$ to $H_4$ are moved away from the take-up reel 8 with the increase in the amount of the tape laminate 9 so as to substantially constantly maintain the spacing between the heaters and the outermost periphery of the tape laminate 9. A suitable reflecting plate 12 is disposed behind the heaters to enhance their heating efficiency, and at the same time, to shield the remaining parts of the apparatus from radiant heat. A cooling nozzle 13 is provided to cool the master tape 1 during the take-up operation. Thus, the slave tape 3 is cooled as soon as it is brought into intimate contact with the master tape 1 and no heat accumulates in the tape laminate 9 taken up on the take-up reel 8 so that the copy can be produced more effectively. A cold blast of air or atomized volatile material may be directed from the nozzle 13 toward the master tape 1 in a direction as shown by the arrow F.

Figure 3:
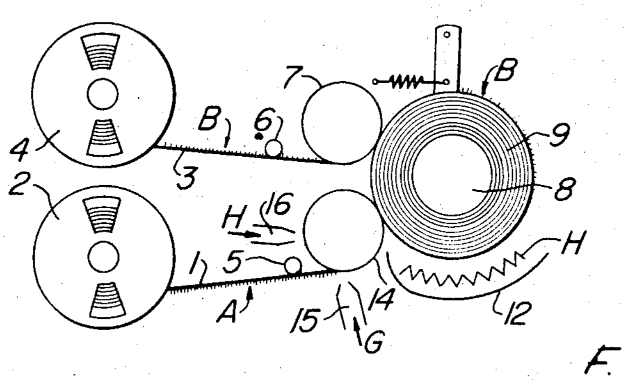
FIGS. 3 through 8 are schematic plan views of other embodiments of the present invention.

FIG. 3 shows a modification of the apparatus of the present invention shown in FIG. 1. In FIG. 3, means are provided so that, after the heated slave tape 3 is brought into intimate contact with the master tape 1, the slave tape 3 can be more quickly and effectively cooled to prevent undesirable accumulation of heat therein. The apparatus shown in FIG. 3 is generally similar to that shown in FIG. 1 except that a roller 14 and two cooling nozzles 15 and 16 in lieu of the nozzle 13 are additionally provided. The master tape 1 runs while engaging a portion of the outer peripheral surface of the roller 14 over a fixed angle, and the take-up reel 8 is disposed to be in pressure contact with both the roller 14 and the capstan 7. The roller 14 may have a structure the same as that of the capstan 7, but may not have a resilient member in the groove thereof. The nozzles 15 and 16 are disposed adjacent to the roller 14 so that the nozzle 15 directs a cold blast of air or atomized volatile material toward the master tape 1 to cool same, while the nozzle 16 directs the same cooling fluid toward the roller 14 to cool same during the take-up operation for the master and slave tapes 1 and 3. According to such an arrangement, cooling can be effected more effectively and the base of the slave tape 3 is heated to a lesser degree. A substantial cooling effect can be provided, even when the nozzle 16 is solely employed in the apparatus shown in FIG. 3.

The above description has referred to an arrangement in which heat is applied to the magnetic surface of the slave tape taken up on the take-up reel together with the master tape during the take-up operation. However, heat may be applied to the magnetic surface of the slave tape before the master and slave tapes are taken up on the take-up reel. Some embodiments of the present invention based on such a heating principle will now be described.

Figure 4:
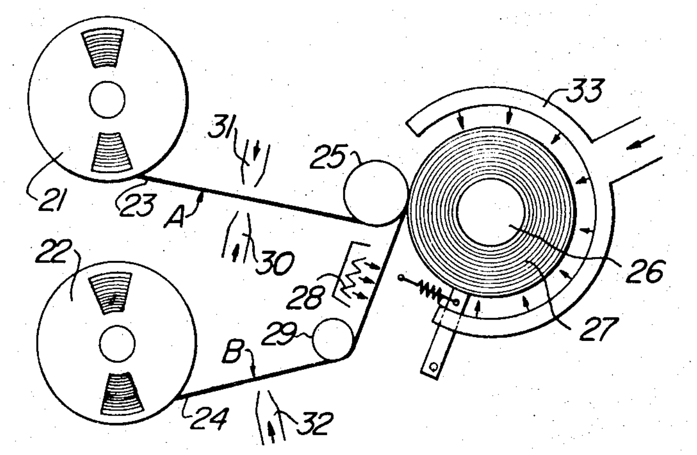

Referring to FIG. 4, a master tape 23 having a record thereon is supplied from a supply reel 21, while a slave tape 24 coated with a magnetic material having a low Curie point such as $CrO_2$ is supplied from a supply reel 22. The master tape 23 and the slave tape 24 supplied from the respective supply reels 21 and 22 are driven by a capstan 25 to be taken up on a flange-less take-up reel 26. The take-up reel 26 is urged by a spring into pressure contact with the capstan 25 through a tape laminate 27 wound around the reel 26 and is thus driven by the capstan 25. The capstan 25 and the take-up reel 26 are similar in structure to those shown in FIG. 2. The magnetic material layer of the master tape 23 is provided on the surface shown by the arrow A and the magnetic material layer of the slave tape 24 is provided on the surface shown by the arrow B so that the magnetic surface of the master tape 23 is brought into contact with the magnetic surface of the slave tape 24 during the take-up operation.

In apparatus having such a basic structure, a cold blast of air or atomized volatile material is directed from a cooling nozzle 32 towards the base surface of the slave tape 24 and then the magnetic surface of the slave tape 24 is heated to a temperature slightly above the Curie point of the magnetic material by a heater 28 which may be an infrared ray lamp. The heater 28 is disposed adjacent to the capstan 25, and the magnetic surface of the slave tape 24 so heated is brought into intimate contact with the magnetic surface of the master tape 23 on the outer periphery of the capstan 25. The master tape 23 runs while being sufficiently cooled by a cold blast of air or atomized volatile material directed from cooling nozzles 30 and 31. Since the master and slave tapes 23 and 24 are generally running at high speeds, the slave tape 24 heated by the heater 28 is brought into contact with the master tape 23 within a very short period of time. Thus, in spite of the fact that the magnetic material layer of the slave tape 24 is heated up to a temperature in the vicinity of the Curie point of the magnetic material, the temperature of the base material layer of the slave tape 24 can be maintained at a value lower than the temperature of the magnetic material layer thereof because the base surface of the slave tape 24 is previously cooled by the cooling fluid supplied from the nozzle 32 and the slave tape 24 is brought into contact with the cooled master tape 23 immediately after the slave tape 24 is subjected to heating. That is to say, the base layer of the running slave tape 24 is maintained at a relatively low temperature, whereas the magnetic material layer of the slave tape 24 is heated up to about the Curie point. The nozzles 30, 31 and 32 are not necessarily essentially required, but are effective for improving the efficiency of copying.

Generally, the base of the slave tape is formed from a transparent resin material such as polyethylene terephthalate, while the magnetic coating is formed from a black material such as $CrO_2$. Therefore, a heater of the kind emitting energy which is absorbed by the black material but which is transmitted through the transparent base may be selected so as thereby to eliminate the need for applying heat solely to the magnetic surface of the slave tape 24 as shown in FIG. 4 and to permit the application of heat to the opposite surfaces of the slave tape 24. The heated slave tape 24 and the master tape 23 are taken up on the take-up reel 26 with their magnetic surfaces brought into intimate contact with each other and are allowed to cool naturally while they are taken up so that the signal recorded on the master tape 23 can be transferred to the slave tape 24. A cooling means 33 shown in FIG. 4 may be provided to direct a cold blast of air or atomized volatile material towards the tape laminate 27 for more quickly cooling same.

The application of heat to the running slave tape 24 means that the slave tape 24 is heated in a state in which tension is more or less imparted thereto. According to the arrangement shown in FIG. 4, a certain rise in the temperature of the base material layer of the slave tape 24 is unavoidable, although the base surface is maintained at a relatively low temperature. In a magnetic tape in which polyethylene terephthalate is used as the base material, a rise in the base temperature above 70° C results in an abrupt stretching of the tape in the direction of tension. It is desirable, therefore, to prevent the base temperature from rising beyond 70° C. In order to minimize undesirable deformation of the slave tape, the tension imparted to the slave tape being heated should be reduced to a minimum. A few arrangements for attaining this purpose will be described with reference to FIGS. 5 and 6.

Figure 5:
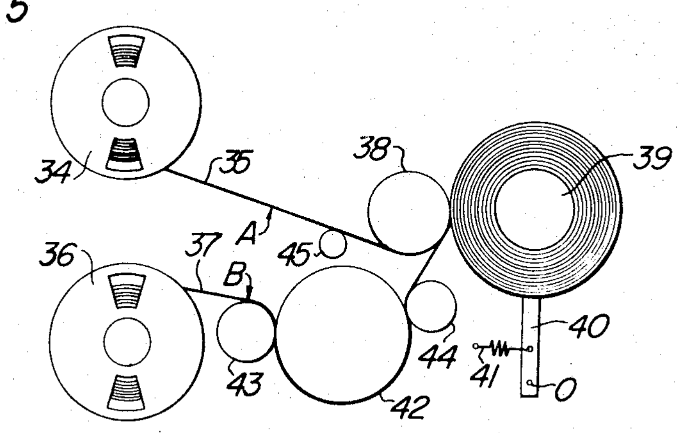

Referring to FIG. 5, a master tape 35 having a record thereon is supplied from a supply reel 34, while a slave tape 37 coated with a magnetic material of a relatively low coercive force is supplied from a supply reel 36. The master and slave tapes 35 and 37 are driven by a capstan 38 to be taken up on a take-up reel 39 as a tape laminate. The take-up reel 39 is carried by a support rod 40 which is freely swingable about a point O. A spring 41 urges the take-up reel 39 into pressure contact with the capstan 38. The capstan 38 and the take-up reel 39 are similar in structure to those shown in FIG. 2. A rotary member 42 having heating means therein acts to apply heat to the slave tape 37, and at the same time, to drive the slave tape 37. Two pinch rollers 43 and 44 are in pressure contact with the rotary member 42. The capstan 38 and the rotary member 42 are arranged to rotate at a substantially equal peripheral speed. A guide post 45 engaging the master tape 35 acts to stabilize the running of the master tape 35.

In the apparatus having the structure described above, the slave tape 37 is driven while engaging with its magnetic surface a portion of the outer peripheral surface of the rotary member 42 over a fixed angle defined by the position of the pinch rollers 43 and 44 and is heated while running along the outer peripheral surface portion of the rotary member 42 by being pressed thereagainst by the pinch rollers 43 and 44. Due to the fact that the portion of the slave tape 37 engaging the outer peripheral surface portion of the rotary member 42 is pressed at opposite ends against the rotary member 42 by the pinch rollers 43 and 44, the tension imparted to this portion of the slave tape 37 can be greatly reduced. Further, since the slave tape 37 is fed toward the capstan 38 by the rotary member 42 and the pinch roller 44, the tension imparted to the slave tape 37 until it is brought into contact with the master tape 35 after leaving the pinch roller 44 can be rendered substantially zero. Thus, the slave tape 37 runs in a substantially tension-free state during heating and until it is brought into contact with the master tape 35 after heating, and any appreciable deformation does not occur in the slave tape 37.

Figure 6:
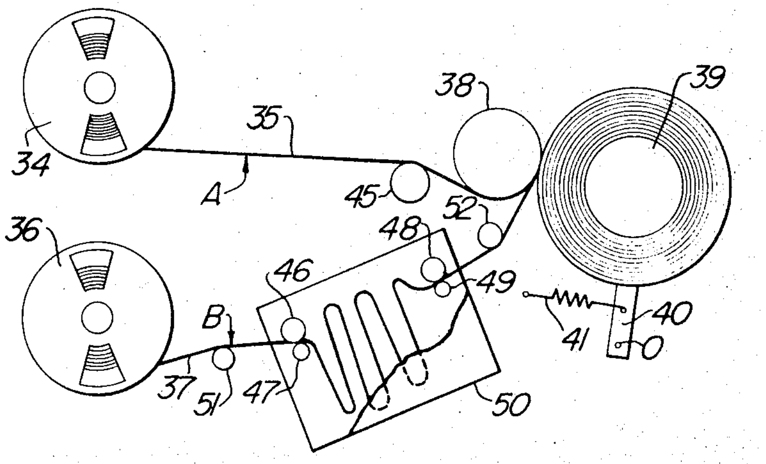

Another embodiment of the present invention shown in FIG. 6 is generally similar to that shown in FIG. 5 except that it has heating means of a different form. Referring to FIG. 6, the slave tape 37 supplied from the supply reel 36 is fed into a heating box 50 before it is brought into contact with the master tape 35 so that the slave tape 37 is heated to a temperature at least in the vicinity of the Curie point of the magnetic material. Capstans 46, 48 and pinch rollers 47, 49 are disposed in the heating box 50. The slave tape 37 is driven by these two sets of capstans and pinch rollers and runs in a slackened state along a zigzag path as shown in FIG. 6 between the set of the capstan 46 and the pinch roller 47 and the set of the capstan 48 and the pinch roller 49. It is so arranged that the speed of the slave tape 37 leaving the nip between the capstan 48 and the pinch roller 49 is substantially equal to the peripheral speed of the capstan 38. The slave tape 37 is guided by guide posts 51 and 52. According to the apparatus shown in FIG. 6, the slave tape 37 can be heated under zero tension, and after heating, runs in a substantially tension-free state until it is brought into contact with the master tape 35, so that any undesirable deformation of the slave tape 37 can be reduced to a minimum.

In the embodiments described above, the slave tape is solely subject to heating and the master tape is not directly heated. Thus, when the copy is produced on the slave tape which is stretched due to heating, the slave tape contracts to the original size when cooled down to room temperature after the copying operation and the pattern of magnetization on the slave tape becomes shorter than the actual pattern of magnetization. This is disadvantageous in the case of magnetic tapes for a rotary head type video tape recorder because the tapes are not interchangeable with one another and are unfit for use. While minimization of the tension imparted to the slave tape during heating as described with reference to FIGS. 5 and 6 is a means for effectively preventing the above disadvantage, this drawback can be also obviated by arrangements shown in FIGS. 7 and 8. In contrast to the previous arrangement in which the slave tape is solely heated and is thus solely subject to deformation thereby adversely affecting the interchangeability, both the master tape and the slave tape are simultaneously subjected to heating in the embodiments shown in FIGS. 7 and 8 so as to cause the some amount of deformation of both the tapes. Due to the fact that the signal is transferred from the master to the slave tape in the equally deformed state, both the tapes contract to their original length after the copying operation and thus the interchangeability is not affected at all.

Figure 7:
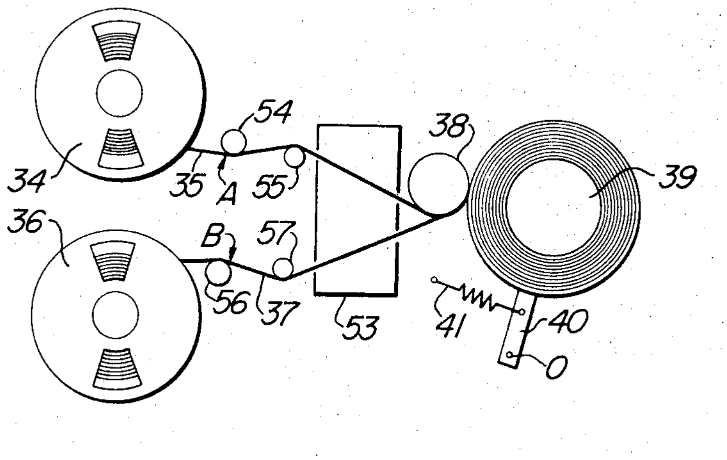

Referring to FIG. 7, elements 34 to 41 are the same as those shown in FIG. 5. The master tape 35 supplied from the supply reel 34 is fed past guide posts 54 and 55 into a heating box 53, while the slave tape 37 supplied from the supply reel 36 is fed past guide posts 56 and 57 into the heating box 53 so that the master and slave tapes 35 and 37 are heated up to the same temperature. The master and slave tapes 35 and 37 leaving the heating box 53 are brought into contact with each other at their magnetic surface on the outer periphery of the capstan 38 and are then taken up on the take-up reel 39.

Figure 8:
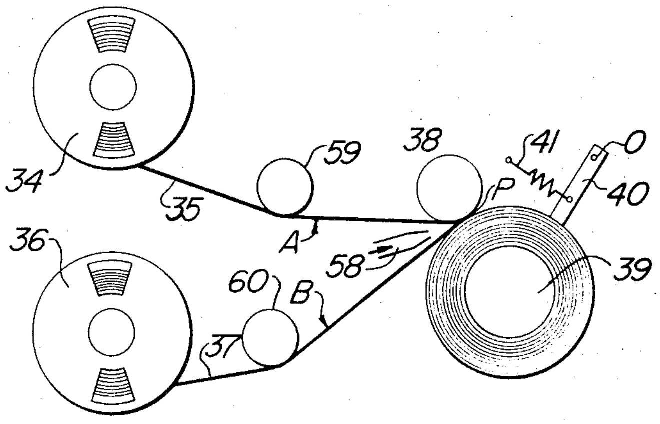

Referring to FIG. 8, elements 34 to 41 are the same as those shown in FIG. 5. The master tape 35 supplied from the supply reel 34 is fed past a guide post 59 toward the nip P between the capstan 38 and the take-up reel 39, while the slave tape 37 supplied from the supply reel 36 is fed past a guide post 60 toward the nip P between the capstan 38 and the take-up reel 39. A nozzle 58 is disposed adjacent to the nip P between the capstan 38 and the take-up reel 39 where the master tape 35 and the slave tape 37 are brought into contact with each other at their magnetic surface. The nozzle 58 directs a hot blast of air or the like towards the magnetic surfaces of the master and slave tapes 35 and 37 to heat the master and slave tapes 35 and 37 to a temperature in the vicinity of the Curie point of the magnetic material coated on the slave tape 37 before the master and slave tapes 35 and 37 brought into contact with each other at their magnetic surface are taken up on the take-up reel 39. In the apparatus shown in FIG. 7, the master and slave tapes 35 and 37 tend to be damaged because both their magnetic surfaces and the base surface of the two tapes are subjected to heat. The apparatus shown in FIG. 8 is advantageous over the apparatus shown in FIG. 7 in that the master tape 35 and the slave tape 37 are substantially damage-free and can be effectively heated because the heat is applied solely to the magnetic surfaces of these tapes in the zone adjacent to the point P at which the two tapes are brought into contact with each other at their magnetic surface. When both the master tape 35 and the slave tape 37 are subject to heating as shown in FIGS. 7 and 8, it is required that the Curie point of the magnetic material coated on the master tape 35 is higher than the Curie point of the magnetic material coated on the slave tape 37.

It will be understood from the foregoing description that the apparatus according to the present invention produces a copy tape by taking up on a single take-up reel a slave tape coated with a magnetic material having a relatively low Curie point and a master tape having a signal recorded on its magnetic coating in such a relation that the two tapes are brought into contact with each other at their magnetic surface, heating the slave tape to a temperature in the vicinity of the Curie point of the magnetic material before or during taking up the tapes on the take-up reel, cooling the tapes after or during the taking-up of a predetermined length of the tape laminate onto the take-up reel thereby transferring the signal recorded on the master tape to the slave tape, and rewinding the two tapes on the respective supply reels upon completion of the copying operation. In the apparatus of the present invention, the signal recorded on the master tape is transferred to the slave tape in the state in which both the tapes are wound around the take-up reel, and as a result, a signal such as an audio signal including recorded signal components of long wavelengths may be sometimes transferred to other layers by skipping over one or more layers. In a tape recorder such as a video tape recorder, a video signal subjected to frequency modulation is successively recorded as a track of record making a fixed angle relative to the longitudinal direction of a tape, while an audio or control signal is recorded as a continuous track of record extending in the longitudinal direction of the tape. When such a tape is used as a master tape for producing a copy thereof, no skip-over transfer of the video signal to a slave tape occurs as it has been subjected to frequency modulation and includes signal components of relatively short wavelengths, but a skip-over transfer of audio signals to the slave tape may frequently occur, due to the fact that it includes signal components of longer wavelengths. In order to avoid such trouble, a magnetic head 17 is provided as shown in FIG. 1 so as to reproduce the audio signal recorded on the master tape during the rewinding operation after the copying operation and the audio signal so reproduced is recorded on the slave tape by another magnetic head 19. An erase head 18 erases the audio signal transferred to the slave tape under heat.

What is claimed is:

1. A Curie point duplicating apparatus for producing a copy of a magnetic tape comprising, in combination, a first rotary means for continuously taking up a master tape having a record thereon and a slave tape supplied from respective supply reels on a single take-up reel in such manner that said master and slave tapes are in contact with each other at their magnetic surfaces;

means for heating the magnetic surface of said slave tape to a temperature of at least in the vicinity of the Curie point of the magnetic material coated on the slave tape before both tapes are brought into intimate contact with each other; and means for rewinding the two tapes taken up on said take-up reel on the respective supply reels after cooling both the master and slave tapes to a predetermined temperature below the Curie point of the magnetic material coated on the slave tape.

2. An apparatus for producing a copy of a magnetic tape according to claim 1, which further comprises cooling means for cooling said master tape before said master tape is brought into contact with said slave tape during take-up operation.

3. An apparatus for producing a copy of a magnetic tape according to claim 1, which further comprises cooling means for cooling both said tapes taken up on said take-up reel to a predetermined temperature below the Curie point of the magnetic material coated on the slave tape.

4. An apparatus for producing a copy of a magnetic tape according to claim 1, which further comprises, in order to deal with a case in which said master has a track of record including principally signal components of relatively long wavelengths and a track of record including principally signal components of relatively short wavelengths, reproducing means for reproducing a signal from the track of record including principally signal components of relatively long wavelengths on said master tape during the rewinding operation, and recording means for recording the reproduced signal on said slave tape.

5. An apparatus for producing a copy of magnetic tape according to claim 1, in which the magnetic surface of said slave tape is exposed at the outermost periphery of the tape laminate taken up on said take-up reel, and said heating means is so positioned that the heating of the magnetic surface of said slave tape is carried out on the take-up reel on which the slave tape is taken up together with the master tape during the take-up operation.

6. An apparatus for producing a copy of a magnetic tape according to claim 5, which further comprises a second rotary member causing the master tape to engage a portion of the outer peripheral surface of the rotary member over a fixed angle and in which the tape laminate is always brought into pressure contact with the second rotary member.

7. An apparatus for producing a copy of a magnetic tape according to claim 1 in which said heating means is so positioned that the heating of the magnetic surface of the slave tape is carried out before the master and the slave tapes are taken up on the take-up reel.

8. An apparatus for producing a copy of a magnetic tape according to claim 7, which comprises cooling means for cooling said slave tape before the same is subjected to heating.

9. An apparatus for producing a copy of a magnetic tape according to claim 7 in which said heating means comprises a rotary member having a heater therein and said slave tape runs while engaging at its magnetic surface with a portion of the outer peripheral surface of said rotary member over a fixed angle.

10. An apparatus for producing a copy of a magnetic tape according to claim 7, in which said heating means comprises a heating box for holding said slave tape therein in a tension-free state for a predetermined period of time.

11. An apparatus for producing a copy of a magnetic tape according to claim 7, said heating means being a heating box in which the master tape also is heated up to at least a temperature of the Curie point of the magnetic material coated on said slave tape during the take-up operation.

12. An apparatus for producing a copy of a magnetic tape according to claim 7, said heating means being so positioned as to direct a blast of hot air or the like towards the magnetic surfaces of said master and slave tapes whereby the master also is heated to a temperature of at least the Curie point of the magnetic material coated on said slave tape during the take-up operation.

* * * * *

UNITED STATES PATENT OFFICE
CERTIFICATE OF CORRECTION

Patent No. 3,676,612 Dated July 11, 1972

Inventor(s) Fukashi KOBAYASHI, Mitsuaki ONO, Akio KUROE

It is certified that error appears in the above-identified patent and that said Letters Patent are hereby corrected as shown below:

Under Foreign Application Priority Data, the date for Application No. 45/65610 should read --June 29, 1970-- instead of "December 29, 1970".

Signed and sealed this 13th day of March 1973.

(SEAL)
Attest:

EDWARD M. FLETCHER, JR.
Attesting Officer

ROBERT GOTTSCHALK
Commissioner of Patents